United States Patent Office 3,738,866
Patented June 12, 1973

3,738,866
FLAME RESISTANT POLYOLEFIN COMPOSITION AND ARTICLE FORMED THEREOF
Stanton C. Martens, New Haven, Conn., assignor to General Electric Company
No Drawing. Continuation of application Ser. No. 805,955, Feb. 20, 1969. This application Aug. 19, 1970, Ser. No. 65,245
Int. Cl. H01b 7/00, 3/30
U.S. Cl. 117—232   9 Claims

ABSTRACT OF THE DISCLOSURE

This invention relates to an insulated wire or cable characterized by a high degree of flame resistance. The conductor of the wire or cable is insulated with a cured product comprising a blend consisting essentially of an unchlorinated polyolefin and a chlorinated polyolefin, the unchlorinated polyolefin being present in a range of about 30 percent to 55 percent by weight and the chlorine in a range of about 20 percent to 35 percent by weight of the blend, a chlorinated polyolefin stabilizer and an organic peroxide.

---

This application is a continuation of then co-pending but now abandoned application Ser. No. 805,955, filed Feb. 20, 1969, which in turn was a continuation of then co-pending but now abandoned application Ser. No. 663,562, filed Aug. 28, 1967, which in turn was a continuation-in-part application of application Ser. No. 558,191 filed May 24, 1966, now abandoned, which was a divisional application of application Ser. No. 158,583, filed Dec. 11, 1961, now abandoned.

This invention relates to flame-resistant polyolefin compositions, and to the method of making same. In its more specific aspect, the invention relates to flame-resistant thermosetting polyolefin compositions suitable for use in insulation, and to wire and cable insulated with said compositions.

Polyethylene compositions cross-linked by a tertiary peroxide, such as di-α-cumyl peroxide, were disclosed and claimed in U.S. Pat. No. 3,079,370 to Precopio and Gilbert and assigned to the same assignee as the present application. Also, U.S. Pat. No. 2,888,424 to Precopio and Gilbert and assigned to the same assignee as the present application, disclosed and claimed similar cross-linked polyethylene compositions containing a suitable filler, e.g., silica, carbon black, alumina, or calcium silicate. An antioxidant such as polymerized trimethyldihydroquinoline for peroxide cross-linked polyethylene was disclosed and claimed in a co-pending application to Eastman bearing Ser. No. 105,868 and filed Apr. 27, 1961, also assigned to the same assignee as the present application.

Peroxide cross-linked polyethylene compositions are widely used as insulation for wire and cable. However, where maximum flame resistance is essential, such as for insulation on switchboard wire, the polyethylene compositions must pass the stringent requirements of Underwriters' Laboratories. This consists in part of a vertical flame test as set out on pages 17–19 of Standards for Safety, Thermoplastic-Insulated Wires UL83, third ed., 1948, published by Underwriters' Laboratories, Inc. According to the vertical flame test, insulation prepared by such polyethylene compositions exhibits satisfactory flame-retardant properties which will not convey a flame, nor continue to burn for more than one minute after five 15-second applications of a standard test flame, applied intermittently at 15 second intervals. Insulation compositions, in addition to being flame resistant, must pass several other standards of Underwriters' Laboratories, such as flexibility and tensile strength, aging, deformation, elastic strength, etc.

This invention has therefore as one of its objects to provide a flame-resistant thermosetting composition of matter suitable for use as wire insulation.

Another object of the invention is to provide a flame-resistant thermosetting composition containing polyethylene and chlorinated polyethylene.

A further object of the invention is to provide wire and cable insulated with a flame-resistant thermosetting composition containing polyethylene and chlorinated polyethylene.

Other objects of the invention will become apparent from a perusal of the following specification.

In its broad aspect, this invention is directed to a flame-resistant curable composition comprising a blend of polyolefin and chlorinated polyolefin, the polyolefin being present in a range of about 30 percent to 55 percent by weight and chlorine in a range of about 20 percent to 35 percent by weight of the polyolefinic blend, a chlorinated polyolefin stabilizer, and a peroxide in which there is at least one unit of the structure

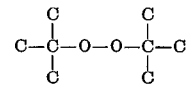

and which substantially decomposes at temperatures in excess of 130° C. while remaining substantially unaffected at lower temperatures.

It is well known that chlorinated polyethylene and other chlorinated hydrocarbons are flame resistant, and further that antimony oxide may be added to polyolefin compositions to promote fire resistance. The present invention is directed to an insulating composition comprising a blend of chlorinated polyolefin and nonchlorinated polyolefin, a stabilizer and a peroxide curing agent. In the preferred embodiment, the insulating composition contains antimony oxide as an additive.

In accordance with my invention, the polyolefin, preferably polyethylene, is blended as by a Banbury mixing operation with a chlorinated polyolefin, preferably chlorinated polyethylene, in a mixture such that the unchlorinated component is present in a range of about 30 percent to 55 percent by weight of the polyolefinic blend and chlorine is present in the blend to the extent of about 20 percent to 35 percent by weight. The stabilizing agent useful for assuring cross-linking of the polyolefins is added to the blend. Generally, other ingredients such as additives and fillers, as required, are incorporated with the blend, and the resulting admixture is thoroughly blended as in a Banbury. A suitable peroxide curing agent is incorporated into the polymeric composition and the blending operation continued to insure substantial uniformity. The peroxide for effecting cross-linking between the polyolefins has at least one unit of the structure

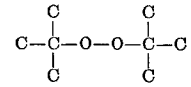

and which substantially decomposes at temperatures in excess of 130° C. while remaining substantially unaffected at lower temperatures. The blending operation containing the peroxide is conducted within a temperature range high enough to render the composition sufficiently plastic to work but below the decomposition temperature of the peroxide curing agent so that substantially little or no decomposition of the peroxide occurs during a normal mixing cycle. In a typical production operation, blending is conducted at a temperature of from about 100 to 130° C., and preferably from 110 to 120° C. If blending is conducted at a temperature much higher than the maximum, the peroxide will decompose thereby causing premature curing of at least a portion of the polyolefins. As a consequence, the composition will be difficult to fabricate, and the final product will exhibit an irregular or roughened surface. The resulting composition is subsequently fabricated as by extrusion to provide an insulation cover for wire or cable. The fabricated product is then cured such as by conventional steam curing at about 400 to 410° F. and 250 p.s.i.g.

Polyolefins and chlorinated polyolefins are well known products and are readily available. Although polyethylene and chlorinated polyethylene are the preferred olefinic compounds useful in the invention, and the invention is described with emphasis as to these two compounds, it should be understood that other olefins such as copolymers of ethylene and propylene are applicable, as well as polymer blends such as a copolymer of ethylene and vinyl acetate with polyethylene. The polyethylene used in preparing compositions of this invention may be made by the conventional high pressure process or the low pressure catalytic process. Linear and nonlinear chlorinated polyethylenes can be used in practicing the invention. DuPont Company sells a nonlinear variety designated LD-321 and a linear variety designated ECO-246, both containing about 45 percent chlorine by weight. The polyolefinic blend should contain about 20 percent to 35 percent by weight chlorine which source is from the chlorinated polyethylene, and therefore the percentages of polyethylene and chlorinated polyethylene will depend somewhat on the chlorine content of the chlorinated polyethylene. Insulating composition made in accordance with this invention containing less than about 20 percent by weight chlorine of the polyeolefinic blend are generally unsatisfactory as not being sufficiently flame resistant to pass the vertical flame test specified by Underwriters' Laboratories. Also, the blended composition should not contain more than about 35 percent by weight chlorine because higher amounts are uneconomical and further can adversely affect the mechanical properties of the composition, such as tensile strength. When the chlorine content of the chlorinated polyethylene is 35 percent or less by weight, it would be necessary to use a considerably larger proportion of the chlorinated compound in the blend in order that the product will pass the vertical flame test. This in turn, will reduce the unchlorinated polyolefin content in the blend to less than 30 percent by weight. A composition of such reduced unchlorinated polyolefin content lacks acceptable tensile strength for insulation applications.

It is desirable in accordance with this invention to have the minimum chlorine content which will enable the composition to pass the vertical flame test. As explained above, the range of chlorine content is about 20 percent to 35 percent by weight of the blended polymers. Where noncombustible additives such as clay, antimony oxide, and alumina are present a lower chlorine content may be employed. As the proportion of noncombustible additives is decreased, it is desirable to increase the chlorine content. Also, the tensile strength of the final product is increased with an increased proportion of unchlorinated polyolefin, the maximum being about 55 percent by weight of the blend and which will still enable the composition to pass the vertical flame test of Underwriters' Laboratories. Thus, the proportions for the ingredients may be varied within the specified limits to meet the mechanical properties desired for an insulation composition.

A suitable chlorinated polyethylene stabilizing agent is incorporated in the blend to assure cross-linking of the polyolefins by neutralizing any free acid formed thereby inhibiting a chain-like reaction resulting in the destruction of the polymer. Such stabilizing agents include, for example, lead oxide or litharge, tri-basic lead silicate-surface, basic lead silicate and magnesium oxide. The amount used will depend upon the amount of chlorinated polyethylene present, but generally will range from about 2 to 15 percent by weight of the polyolefinic blend, and preferably 8 to 12 percent. Lower amounts than this generally will not be sufficient to assure the desired cross-linking, whereas higher amounts produce no desired additional affect and are uneconomical.

The proportion of peroxide used as the curing agent depends largely upon the mechanical properties sought in the cured product, for example tensile strength. A range of from about 0.5 to 10 parts peroxide by weight per 100 parts of the polyolefinic blend satisfies most requirements and the usual proportion is of the order of 3 to 4 parts peroxide. The peroxide is more costly than the polyolefins and any fillers which might be used, and therefore economy dictates using the minimum peroxide which will provide the properties desired in the cured material.

The peroxides of this invention are characterized as substantially decomposing at temperatures in excess of 130° C. and having at least one unit of the structure.

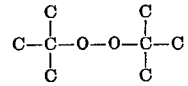

One of the best of the tertiary peroxides used as a crosslinking agent is di-α-cumyl peroxide, a compound of the structure

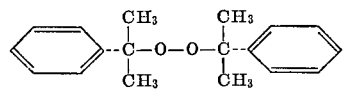

The following peroxides are also useful:

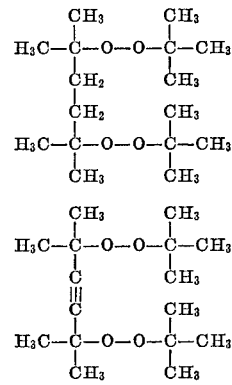

In general, tertiary peroxides which can be used to cure polyethylene are those having the following formula:

where R and R' (which may or may not be similar) are radicals selected from the group consisting of

and

These peroxides may be described as peroxides in which each of the peroxide oxygens is linked directly to a tertiary carbon atom whose remaining valences are attached to radical selected from the group consisting of $R_1$, $R_2$, $R_3$, $R_4$, $R_5$, and $R_6$. $R_1$, $R_2$, $R_3$, $R_4$, comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkylalkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is diphenylcyclohexyl peroxide,

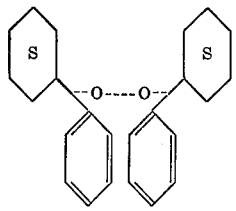

Mixtures of these peroxides may also be used.

In addition, these peroxides may contain inorganic groups, such as halogens, nitro groups, etc., for example, chlorophenyl, bromophenyl, nitrophenyl, etc.

Additional components which are desirably present are fillers such as finely divided clay, alumina, carbon black, and antimony oxide, an antioxidant such as polymerized trimethyldihydroquinolines and a lubricant such as calcium stearate to prevent the composition from sticking during fabrication. Filler materials which do not adversely affect the electrical properties of the polyolefins may be added in proportions as high as 75 or more parts by weight of filler per one hundred parts of polyolefin blend. Typical fillers which are used are carbon black, and clay which preferably is neutralized by the addition of an aluminum soap such as aluminum oleate.

The processing of clays useful in compositions of this invention is described in a report contained in Industrial and Engineering Chemistry, May 1960, p. 370 et. seq. The clay is calcined to reduce its moisture content to less than 0.5 percent and its specific gravity to about 2.6 and the calcined product possesses a particle size of the order to 2 microns diameter. When di-α-cumyl peroxide is used as the curing agent, it is desirable to treat the clay with a small quantity (about ½ percent) of an aluminum soap such as aluminum oleate.

EXAMPLE 1

Polyethylene (50 parts) and calcium stearate (1 part) were worked on a mill having a roll temperature of 230° F. until the polyethylene banded on the mill roll. A nonlinear chlorinated polyethylene (50 parts) containing 45 percent chlorine content by weight was then added to the polyethylene and milling continued until the two materials were a homogeneous blend. A finely divided clay (50 parts) pretreated with aluminum oleate (½ part) was mixed with lead oxide (10 parts), antimony oxide (5 parts) and polymerized trimethyldihydroquinoline (1.25 parts) (Aminox) and this mixture was then introduced to the blended polyethylene compounds undergoing milling. As soon as the composition on the mill became uniform, di-α-cumyl peroxide (3.2 parts) was added and worked into the composition as in the case of the previous additives. The composition was then removed from the mill and stored until the extrusion apparatus was ready for a test run.

The composition was extruded in a wall ⅗₄ inch thick on #14 AWG and ⅖₄ inch on #12 AWG solid conductor. This wire (#12) passed the vertical flame test. The wire (#14) was tested for electrical properties while immersed in water at 50° C. and subjected to a potential of 600 volts AC with the following results:

| | Insul. resist., megohms/100 ft. | Percent power factor | Specific inductive capacitance |
|---|---|---|---|
| 1 day | 98.7 | 2.1 | 4.57 |
| 1 week | 121 | 2.6 | 4.65 |
| 2 weeks | 159 | 2.5 | 4.67 |
| 3 weeks | 133 | 2.6 | 4.70 |
| 4 weeks | 30.4 | 2.7 | 4.72 |
| 5 weeks | 15.9 | 2.8 | 4.75 |
| 6 weeks | 11.3 | 2.9 | 4.77 |
| 7 weeks | 7.05 | 3.1 | 4.80 |
| 8 weeks | 5.33 | 3.2 | 4.83 |
| 9 weeks | 5.89 | 3.1 | 4.84 |
| 10 weeks | 4.22 | 3.3 | 4.87 |
| 11 weeks | 3.87 | 3.3 | 4.90 |
| 12 weeks | 4.36 | 3.2 | 4.92 |
| 13 weeks | 4.50 | 3.4 | 4.94 |
| 14 weeks | 4.80 | 3.4 | 5.00 |
| 15 weeks | 5.44 | 3.5 | 5.00 |
| 16 weeks | 5.91 | 3.6 | 5.02 |
| 17 weeks | 7.08 | 3.6 | 5.04 |
| 18 weeks | 8.01 | 3.6 | 5.08 |
| 19 weeks | 8.07 | 3.7 | 5.12 |
| 20 weeks | 10.13 | 3.6 | 5.13 |
| 21 weeks | 11.0 | 3.7 | 5.16 |
| 22 weeks | 19.2 | 3.6 | 5.18 |
| 23 weeks | 11.8 | 3.8 | 5.21 |
| 24 weeks | 18.4 | 3.6 | 5.23 |

EXAMPLE 2

The milling procedure of Example 1 was followed in Examples 2 through 7 except that the roll temperature was varied from 220° F. to 260° F. In some cases the samples were not tested by extrusion onto wire but by press curing within a temperature range of 275° F. to 400° F. or steam curing at 407° F. (250 p.s.i.g.). In Example 2 the milling procedure of Example 1 was followed but the composition was 38 parts of polyethylene to 62 parts of nonlinear chlorinated polyethylene containing 45 percent chlorine by weight. When press-cured, a sample of this composition had a tensile strength of 2250 p.s.i. and an elongation of 490 percent.

EXAMPLE 3

The milling procedure of Example 1 was followed but the composition consisted of 50 parts of a 70–30 copolymer of ethylene and vinyl acetate, 50 parts of nonlinear chlorinated polyethylene containing 45 percent by weight of chlorine, 50 parts of clay, 50 parts of a semi-reinforcing furnace black, 10 parts of lead oxide, 5 parts of antimony oxide, 0.75 parts of a polymer of trimethyldihydroquinoline (Flectol-H), and 2.4 parts of di-α-cumyl peroxide. A press-cured sample of the composition has a tensile strength of 2720 p.s.i. and an elongation of 270 percent.

EXAMPLE 4

The milling procedure of Example 1 was followed with a composition consisting of 50 parts of a 67–33 copolymer of ethylene and propylene, 50 parts of linear chlorinated polyethylene containing 45 percent by weight of chlorine, 50 parts of a semi-reinforcing furnace black, 10 parts of lead oxide, 5 parts of antimony oxide, 0.75 part of trimethyldihydroquinoline (Aminox) and 3.2 parts of di-α-cumyl peroxide. A press-cured sample of this composition possessed a tensile strength of 1270 p.s.i. and an elongation of 490 percent.

EXAMPLE 5

The milling procedure of Example 1 was followed on a composition consisting of 50 parts polyethylene, 50 parts of nonlinear chlorinated polyethylene containing 45 percent by weight of chlorine, 50 parts of clay, 10 parts lead oxide, 5 parts antimony oxide, 0.75 part triemthyldihydroquinoline, and 6 parts of 50 percent strength 2,5-dimethyl-2,5,-di(t-butylperoxy) hexane (Varox). A press-cured sample of this composition possessed a tensile strength of 1850 p.s.i. and an elongation of 460 percent. A steam-cured sample possessed a tensile strength of 1300 p.s.i. and an elongation of 510 percent.

EXAMPLE 6

The milling procedure of Example 1 was followed with a composition which was the same as Example 5 except that the peroxide was 6 parts of 50 percent strength 2,5-dimethyl - 2,5 - di(t - butylperoxy) hexane-3 (Luperco-130XL). A press-cured sample possessed a tensile strength of 1570 p.s.i. and an elongation of 450 percent. A steam-cured sample possessed a tensile strength of 1280 p.s.i. and an elongation of 490 percent.

EXAMPLE 7

The milling procedure of Example 1 was followed with a composition consisting of 50 parts of a 67-33 copolymer of ethylene and propylene, 50 parts of linear chlorinated polyethylene containing 45 percent by weight of chlorine, 75 parts of a semi-reinforcing carbon black, 7 parts of maleic anhydride, 20 parts of lead oxide, 5 parts of antimony oxide, 0.75 part of polymerized trimethyldihydroquinoline (Aminox) and 3.2 parts of di-α-cumyl peroxide. A press-cured sample had a tensile strength of 1250 p.s.i. and an elongation of 360 percent.

EXAMPLE 8

The procedure of Example 1 was substantially followed except that Banbury mixing of the ingredients was employed and the roll temperature varied from 220 to 260° F. The composition comprised 53 parts of polyethylene and 47 parts of chlorinated polyethylene containing 42.5 percent by weight of chlorine thereby forming a blend of substantially 20 percent by weight chlorine. The composition was extruded as a 1/32 inch well on a #12 AWG metallic conductor and then cured. The wire product passed the vertical flame test.

EXAMPLE 9

The precedure of Example 8 was followed but the composition consisted of 59 parts polyethylene and 41 parts chlorinated polyethylene thereby resulting in a polymer blend containing 17.5 percent chlorine. The wire product failed the vertical flame test because of the low chlorine content.

While the invention has been described with reference to certain specific embodiments, it is obvious that there may be variations which fall within the true spirit and scope of the invention. Accordingly, the invention should be limited in scope only as may be necessitated by the scope of the appended claims.

I claim:

1. An electrical cable which comprises a conductor and a layer of flame resistant cross-linked polyolefin insulation extruded over said conductor, said flame resistant insulation comprising the peroxide cross-link cured polyolefin product of (a) a substantially homogeneous blend of (i) an unchlorinated polyolefin selected from the group consisting of polyethylene, ethylene-propylene, and ethylene-vinyl acetate, and (ii) chlorinated polyethylene, the unchlorinated polyolefin being present in a range of about 30 percent to 55 percent by weight and the chlorine of the chlorinated polyethylene is in a range of about 20 percent to 35 percent by weight of the blend, and (b) a chlorinated polyethylene stabilizer, and (c) between 0.5 and 10 parts by weight per hundred parts by weight of the blend of organic tertiary peroxide curing agent.

2. In the cable according to claim 1 wherein said chlorinated polyethylene contains about 45 percent by weight of chlorine.

3. In the cable according to claim 1 wherein said unchlorinated polyolefin is present in approximately 38 parts and said chlorinated polyethylene is present in approximately 50 parts.

4. In the cable according to claim 1 wherein said unchlorinated polyolefin is present in approximately 38 parts and said chlorinated polyethylene is present in approximately 62 parts.

5. In the cable according to claim 1 wherein said stabilizer is lead oxide.

6. An electrical cable which comprises a conductor and a layer of flame resistant cross-linked polyolefin insulation extruded over said conductor, said flame resistant insulation comprising the peroxide cross-linked cured polyolefin product of (a) a substantially homogeneous blend of unchlorinated polyethylene and chlorinated polyethylene, the unchlorinated polyethylene being present in a range of 30 percent to 55 percent by weight and the chlorine of the chlorinated polyolefin is in a range of 20 percent to 35 percent by weight of the blend, (b) about 2 to 15 percent by weight of the blend of a chlorinated polyethylene stabilizer, (c) a filler material, and (d) between 0.5 and 10 parts by weight per hundred parts of the blend of a peroxide in which there is at least one unit of the structure

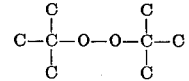

and which substantially decomposes at temperatures in excess of 130° C. while being substantially unaffected by lower temperatures.

7. In the cable according to claim 6 wherein said filler is a mineral clay, the peroxide is di-α-cumyl peroxide and the chlorinated polyethylene chlorine content is about 45 percent.

8. In the cable according to claim 6 wherein said stabilizer is lead oxide.

9. In the cable according to claim 6 wherein said insulation includes antimony oxide.

References Cited
UNITED STATES PATENTS 2,480,298   8/1949   Happoldt.
3,171,866   3/1965   Meyer et al.

WILLIAM D. MARTIN, Primary Examiner
J. A. BELL, Assistant Examiner

U.S. Cl. X.R.
117—128.4, 136, 161 UF, 161 UZ; 252—8.1